US012699647B2

(12) United States Patent
Yu

(10) Patent No.: US 12,699,647 B2
(45) Date of Patent: Aug. 4, 2026

(54) PROCESSING UNMAP COMMANDS IN MEMORY SYSTEMS

(71) Applicant: Yangtze Memory Technologies Co., Ltd., Wuhan (CN)

(72) Inventor: Shengfei Yu, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/635,925

(22) Filed: Apr. 15, 2024

(65) Prior Publication Data

US 2025/0278357 A1    Sep. 4, 2025

(30) Foreign Application Priority Data

Mar. 4, 2024    (CN) .......................... 202410243074.1

(51) Int. Cl.
*G06F 12/02* (2006.01)
(52) U.S. Cl.
CPC .. *G06F 12/0246* (2013.01); *G06F 2212/7201* (2013.01); *G06F 2212/7203* (2013.01)
(58) Field of Classification Search
None
See application file for complete search history.

(56) References Cited

U.S. PATENT DOCUMENTS 12,216,574 B2 *  2/2025  Takatsu ............... G06F 12/0246
2013/0219106 A1 *  8/2013  Vogan ................. G06F 12/0246
                                                        711/E12.008

| | | | |
|---|---|---|---|
| 2016/0117099 A1 * | 4/2016 | Prins | G06F 3/061 |
| | | | 711/103 |
| 2016/0117252 A1 * | 4/2016 | Thangaraj | G06F 12/0804 |
| | | | 711/118 |
| 2016/0342509 A1 * | 11/2016 | Kotte | G06F 12/0246 |
| 2019/0220416 A1 * | 7/2019 | Jung | G06F 12/1009 |
| 2020/0057724 A1 * | 2/2020 | Byun | G06F 3/0659 |
| 2020/0142793 A1 * | 5/2020 | Zapotylok | G06F 3/0659 |
| 2020/0218470 A1 * | 7/2020 | Cho | G06F 3/0679 |
| 2021/0405918 A1 * | 12/2021 | Li | G06F 12/0882 |

(Continued)

OTHER PUBLICATIONS

JEDEC Standard, "Universal Flash Storage (UFS) Version 3.1," JEDEC Solid State Technology Association, JESD220E, Jan. 2020, 421 pages.

*Primary Examiner* — Yaima Rigol
(74) *Attorney, Agent, or Firm* — Fish & Richardson P.C.

(57) ABSTRACT

The present disclosure involves methods, apparatuses, systems, and computer-readable storage media for processing memory controller commands in a memory system, and in particular, for processing unmap commands. In one example, a method for operating a memory system includes receiving, from a host, an unmap command corresponding to one or more logical addresses. The method further includes, in response to determining that a quantity of the one or more logical addresses is less than or equal to a first threshold, storing the one or more logical addresses in a buffer of a memory controller of the memory system. The method further includes updating a mapping table based on logical addresses stored in the buffer to unmap a mapping relationship between the logical addresses and corresponding physical addresses in the mapping table. The logical addresses stored in the buffer correspond to more than one unmap command.

20 Claims, 8 Drawing Sheets

MEMORY CONTROLLER

MEMORY DEVICE

RECEIVE UNMAP COMMAND FROM HOST — 602

LBA LENGTH ≤ THRESHOLD? — 604
NO
YES

GENERATE LCA CORRESPONDING TO LBA — 606

STORE LCA IN P2L BUFFER — 608

SEND PROGRAM COMMAND TO MEMORY DEVICE TO PROGRAM DUMMY DATA CORRESPONDING TO LCA — 610

GENERATE DUMMY DATA CORRESPONDING TO LCA — 622

STORE DUMMY DATA AND CORRESPONDING META DATA — 624

P2L BUFFER FULL? — 612
NO
YES

UPDATE MAPPING TABLE — 614

600

(56)          References Cited

U.S. PATENT DOCUMENTS

| | | | |
|---|---|---|---|
| 2022/0114087 A1* | 4/2022 | Kim .................... | G06F 13/1673 |
| 2022/0283734 A1* | 9/2022 | Jang .................... | G06F 3/0619 |
| 2023/0350808 A1* | 11/2023 | Wang .................... | G06F 12/10 |
| 2025/0103489 A1* | 3/2025 | Tal .................... | G06F 12/0253 |

* cited by examiner

202

104

206

104

802 — UPDATE L2P MAPPING TABLE, VPC TABLE, AND CHECKPOINT

804 — SEND 1ST LEVEL L2P MAPPING TABLE AND VPC TABLE TO MEMORY DEVICE

806 — SEND 2ND LEVEL L2P MAPPING TABLE AND CHECKPOINT TO MEMORY DEVICE

PROCESSING UNMAP COMMANDS IN MEMORY SYSTEMS

CROSS-REFERENCE TO RELATED APPLICATIONS

This application claims priority to Chinese Patent Application No. 202410243074.1, filed on Mar. 4, 2024, which is hereby incorporated by reference in its entirety.

TECHNICAL FIELD

The present disclosure generally relates to memory devices and systems for processing memory controller commands.

BACKGROUND

A memory system can include one or more memory devices and a memory controller that manages the data stored in the one or more memory devices and communicates with a host. In some cases, the memory system can be a non-volatile memory (e.g., NAND flash memory) that stores data in pages and erase data in blocks comprising multiple pages. A host can communicate commands to the memory system that contain logical addresses (e.g., logical block addresses, "LBAs"). The memory system can map these logical addresses into physical addresses (e.g., physical block addresses, "PBAs") based on a mapping table (e.g., a logical to physical (L2P) mapping table).

SUMMARY

The present disclosure relates to processing memory controller commands in a memory system, and in particular, to processing unmap commands. In one example, a method for operating a memory system includes receiving, from a host, an unmap command corresponding to one or more logical addresses. The method further includes, in response to determining that a quantity of the one or more logical addresses is less than or equal to a first threshold, storing the one or more logical addresses in a buffer of a memory controller of the memory system. The method further includes updating a mapping table based on logical addresses stored in the buffer to unmap a mapping relationship between the logical addresses and corresponding physical addresses in the mapping table. The logical addresses stored in the buffer correspond to more than one unmap command.

The method can include one or more of the following features.

In some implementations, the method further includes, in response to determining that a data volume of the logical addresses stored in the buffer is greater than or equal to a second threshold, updating the mapping table.

In some implementations, the buffer can include a physical-to-logical (P2L) buffer. The logical addresses stored in the buffer are stored in the P2L buffer. The second threshold can be the size of the P2L buffer.

In some implementations, storing the one or more logical addresses in the buffer can further include flipping a pre-selected bit in each one of the one or more logical addresses. The pre-selected bit can indicate the one or more logical addresses are to be unmapped from corresponding one or more physical addresses when updating the mapping table.

In some implementations, the method further includes, in response to receiving the unmap command, performing a program operation associated with the one or more logical addresses.

In some implementations, performing the program operation includes sending, by the memory controller to a memory device of the memory system, a program command associated with the program operation.

In some implementations, the program operation includes storing meta data in the memory device. The meta data comprise the one or more logical addresses.

In some implementations, the method further includes, in response to restoring the one or more logical addresses in the buffer, receiving, from the memory device, the one or more logical addresses comprised in the meta data.

In some implementations, the mapping table includes a logical-to-physical (L2P) mapping table, a valid-page-count (VPC) table and a checkpoint. Updating the mapping table includes updating the corresponding physical addresses in the L2P mapping table, updating the VPC table and the checkpoint based on the logical addresses stored in the buffer.

In some implementations, the L2P mapping table includes a first-level L2P mapping table and a second-level L2P mapping table. The method further includes respectively sending to a memory device coupled to the memory controller: (1) the first-level L2P mapping table and the VPC table, and (2) the second-level L2P mapping table and the checkpoint.

In some implementations, the unmap command includes a discard unmap command.

Certain aspects of the subject matter described here can be implemented as a memory controller. The memory controller includes one or more processors and a storage medium including a buffer. The storage medium stores instructions for execution by the one or more processors to perform operations including receiving, from a host, an unmap command corresponding to one or more logical addresses. The operations also include, in response to determining that a quantity of the one or more logical addresses is less than or equal to a first threshold, storing the one or more logical addresses in the buffer. The operations further include updating a mapping table based on logical addresses stored in the buffer to unmap a mapping relationship between the logical addresses and corresponding physical addresses in the mapping table. The logical addresses stored in the buffer correspond to more than one unmap command.

The memory controller can include one or more of the following features.

In some implementations, the buffer includes a physical-to-logical (P2L) buffer. The logical addresses stored in the buffer are stored in the P2L buffer.

In some implementations, the operations further include, in response to receiving the unmap command, sending a program command associated with the one or more logical addresses to a memory device coupled to the memory controller.

In some implementations, the operations further include, in response to restoring the one or more logical addresses in the buffer, receiving, from the memory device, the one or more logical addresses comprised in meta data associated with the program command.

In some implementations, the unmap command includes a discard unmap command.

Certain aspects of the subject matter described here can be implemented as a memory system. The memory system includes a memory device and a memory controller. The memory system is configured to perform operations including receiving, from a host, an unmap command corresponding to one or more logical addresses. The operations also include, in response to determining that a quantity of the one or more logical addresses is less than or equal to a first threshold, storing the one or more logical addresses in a buffer of the memory controller. The operations further include updating a mapping table based on logical addresses stored in the buffer to unmap a mapping relationship between the logical addresses and corresponding physical addresses in the mapping table. The logical addresses stored in the buffer correspond to more than one unmap command.

The memory system can include one or more of the following features.

In some implementations, the buffer can include a physical-to-logical (P2L) buffer. The logical addresses stored in the buffer are stored in the P2L buffer. The second threshold can be the size of the P2L buffer.

In some implementations, the operations further includes, in response to receiving an unmap command, performing a program operation associated with the one or more logical addresses.

In some implementations, the program operation includes sending, by the memory controller to the memory device, a program command associated with the program operation. The program operation further includes storing meta data in the memory device, wherein the meta data comprise the one or more logical addresses.

Certain aspects of the subject matter described here can be implemented as a non-transitory computer-readable storage medium storing instructions that, when executed by a processing device, cause the processing device to perform operations including receiving, from a host, an unmap command corresponding to one or more logical addresses. The operations also include, in response to determining that a quantity of the one or more logical addresses is less than or equal to a first threshold, storing the one or more logical addresses in a buffer of a memory controller. The operations further include updating a mapping table based on logical addresses stored in the buffer to unmap a mapping relationship between the logical addresses and corresponding physical addresses in the mapping table. The logical addresses stored in the buffer correspond to more than one unmap command.

While generally described as computer-implemented software embodied on tangible media that processes and transforms the respective data, some or all of the aspects can be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF DRAWINGS

Like reference numbers and designations in the various drawings indicate like elements.

DETAILED DESCRIPTION

Figure 1:
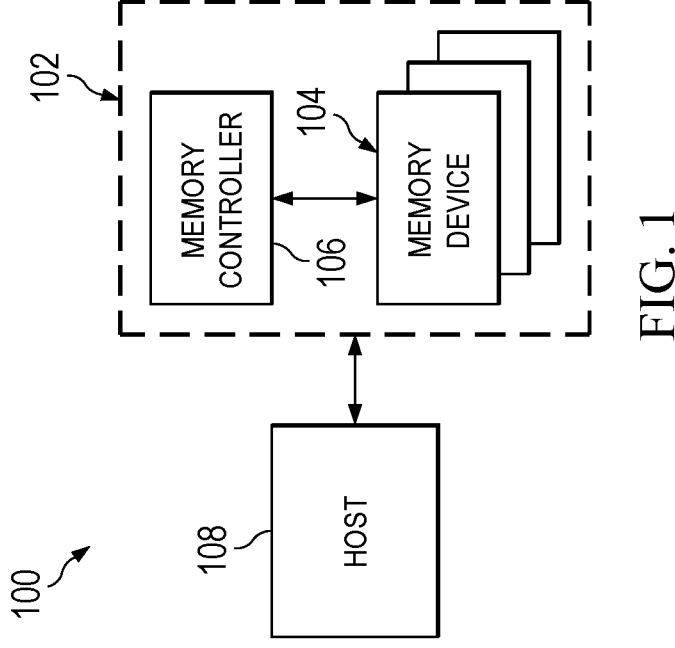
FIG. 1 illustrates a block diagram of an example system having a memory device, according to some aspects of the present disclosure.

In memory systems, an unmap command can be used to free storage space in a memory device allocated to store unused data. For example, when a host determines that certain data are no longer needed or are deleted, it can send an unmap command to the memory system. The memory system can then update a mapping relationship between logical addresses of the unused data and physical memory space storing the unused data, by disassociating or "unmapping" the logical addresses with the physical addresses of the physical memory space in a mapping table.

The unmap command can be processed in different ways. For example, for each unmap command received from the host, the memory controller can perform a mapping table update operation to unmap the logical addresses associated with the unmap command with the corresponding physical addresses. The mapping table update operation may require a read operation on the memory device to read the existing mapping table stored in the memory device. The mapping table update operation may also require a program operation on the memory device to store the mapping table in the memory controller, after the mapping table is updated by a flash translation layer of the memory controller. Frequently updating the mapping table can cause latency of the memory controller in processing other commands, wear out the storage space in the memory device where the mapping table is stored (e.g., the system-data storage space of the memory device), or reduce the service span of the memory device.

The present disclosure provides techniques to process unmap commands, for example, in an accumulative way. In some implementations, a memory controller can determine whether a received unmap command is an unmap command of small chunk size (e.g., the length of the logical block addresses (LBAs) to be unmapped is smaller than a predefined threshold). In response to receiving an unmap command of small chunk size, the memory controller can first temporarily store the logical addresses associated with the unmap command in a buffer of the memory controller. The memory controller can update the mapping table at a later phase. For example, when a volume of the logical addresses in the buffer is accumulated to a certain level (e.g., a physical-to-logical (P2L) buffer comprised in the buffer is full), the memory controller can update the mapping table based on the logical addresses in the buffer, and the logical addresses in the buffer correspond to more than one unmap command.

The techniques described in the present disclosure can be implemented to achieve one or more of the following advantages. For example, the frequency that a mapping table is updated can be reduced, hence reducing latency in the memory system. The wear level on part of the storage space in the memory device where the mapping table is stored can also be reduced. Moreover, the service span of the memory device can be increased by balancing the wear level of the storage space in the memory device where the mapping table is stored (e.g., a system-data storage space) and other storage space in the memory device (e.g., a user-date storage space).

The above aspects and some other aspects of the present disclosure are discussed in greater detail below.

FIG. 1 illustrates a block diagram of an example system 100 having a memory device, according to some aspects of the present disclosure. The system 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 1, the system 100 can include a host 108 and a memory system 102 having one or more memory devices 104 and a memory controller 106. The host 108 can include one or more processors of an electronic device. The processor can be a central processing unit (CPU), or a system-on-chip (SoC), such as an application processor (AP). The host 108 can be configured to send or receive data and commands to or from the memory systems 102.

The memory device 104 can be any memory device disclosed in the present disclosure, such as a NAND Flash memory device. It is noted that the NAND Flash is only one example of memory device for illustrative purposes. It can include any suitable solid-state, non-volatile memory, e.g., NOR Flash, Ferroelectric RAM (FeRAM), Phase-change memory (PCM), Magneto-resistive random-access memory (MRAM), Spin-transfer torque magnetic random-access memory (STT-RAM), or Resistive random-access memory (RRAM), etc. In some implementations, memory device 104 includes a three-dimensional (3D) NAND Flash memory device.

The memory controller 106 can be implemented by microprocessors, microcontrollers (a.k.a. microcontroller units (MCUs)), digital signal processors (DSPs), application-specific integrated circuits (ASICs), field-programmable gate arrays (FPGAs), programmable logic devices (PLDs), state machines, gated logic, discrete hardware circuits, and other suitable hardware, firmware, and/or software configured to perform the various functions described below in detail.

The memory controller 106 is coupled to the memory device 104 and to the host 108, and is configured to control the memory device 104, according to some implementations. The memory controller 106 can manage the data stored in the memory device 104 and can communicate with the host 108. In some implementations, the memory controller 106 is designed for operating in a low duty-cycle environment, such as secure digital (SD) cards, compact Flash (CF) cards, universal serial bus (USB) Flash drives, or other media for use in electronic devices, such as personal computers, digital cameras, mobile phones, etc. In some implementations, memory controller 106 is designed for operating in a high duty-cycle environment solid state drives (SSDs) or embedded multi-media-cards (eMMCs) used as data storage for mobile devices, such as smartphones, tablets, laptop computers, etc., and enterprise storage arrays. The memory controller 106 can be configured to control operations of the memory device 104, such as read, erase, and program operations. The memory controller 106 can also be configured to manage various functions with respect to the data stored or to be stored in the memory device 104 including, but not limited to bad-block management, garbage collection, logical-to-physical address conversion, logical-to-physical mapping management, wear leveling, etc. In some implementations, the memory controller 106 is further configured to process error correction codes (ECCs) with respect to the data read from or written to the memory device 104. Any other suitable functions can be performed by the memory controller 106 as well, for example, formatting the memory device 104.

The memory controller 106 can communicate with an external device (e.g., the host 108) according to a particular communication protocol. For example, the memory controller 106 can communicate with the external device through at least one of various interface protocols, such as a USB protocol, an MMC protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc. The memory controller 106 is configured to receive and transmit a command to and from the host 108, and execute or perform multiple functions and operations provided in the present disclosure, which will be described later.

Figure 2A:
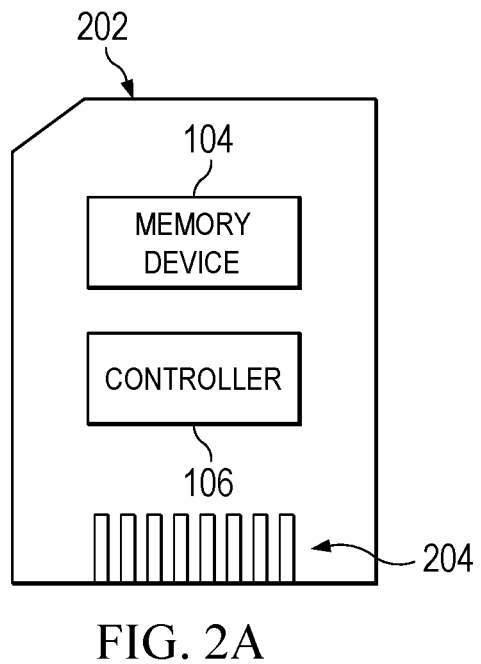
FIGS. 2A-2B illustrate example storage products, according to some aspects of the present disclosure.
Figure 2B:
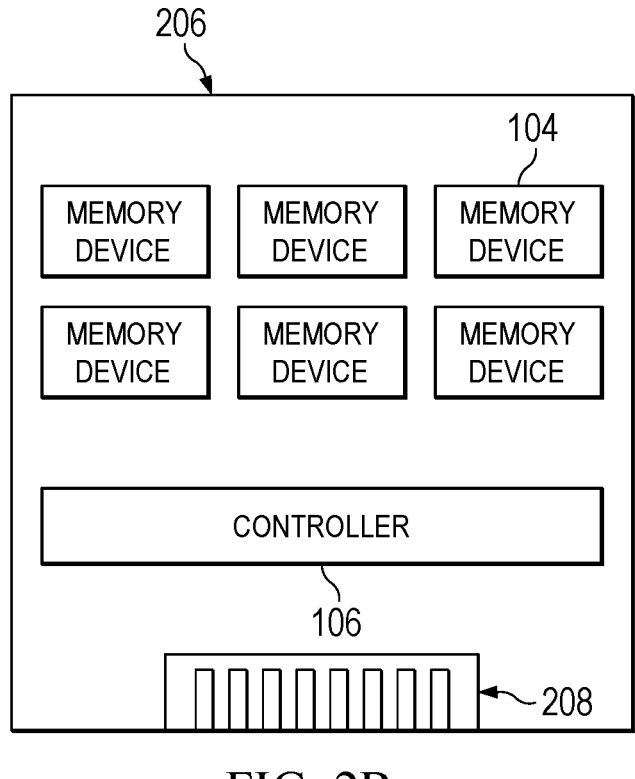

Memory controller 106 and one or more memory devices 104 can be integrated into various types of storage devices, for example, being included in the same package, such as a universal Flash storage (UFS) package or an eMMC package. That is, memory system 102 can be implemented and packaged into different types of end electronic products. In one example as shown in FIG. 2A, the memory controller 106 and a single memory device 104 can be integrated into a memory card 202. The memory card 202 can include a PC card (PCMCIA, personal computer memory card international association), a CF card, a smart media (SM) card, a memory stick, a multimedia card (MMC, RS-MMC, MMC-micro), an SD card (SD, miniSD, microSD, SDHC), a UFS, etc. The memory card 202 can further include a memory card connector 204 coupling the memory card 202 with a host (e.g., host 108 in FIG. 1). In another example as shown in FIG. 2B, the memory controller 106 and multiple memory devices 104 can be integrated into an SSD 206. The SSD 206 can further include an SSD connector 208 that couples the SSD 206 with a host (e.g., host 108 in FIG. 1). In some implementations, the storage capacity and/or the operation speed of the SSD 206 is greater than those of memory card 202.

Figure 3:
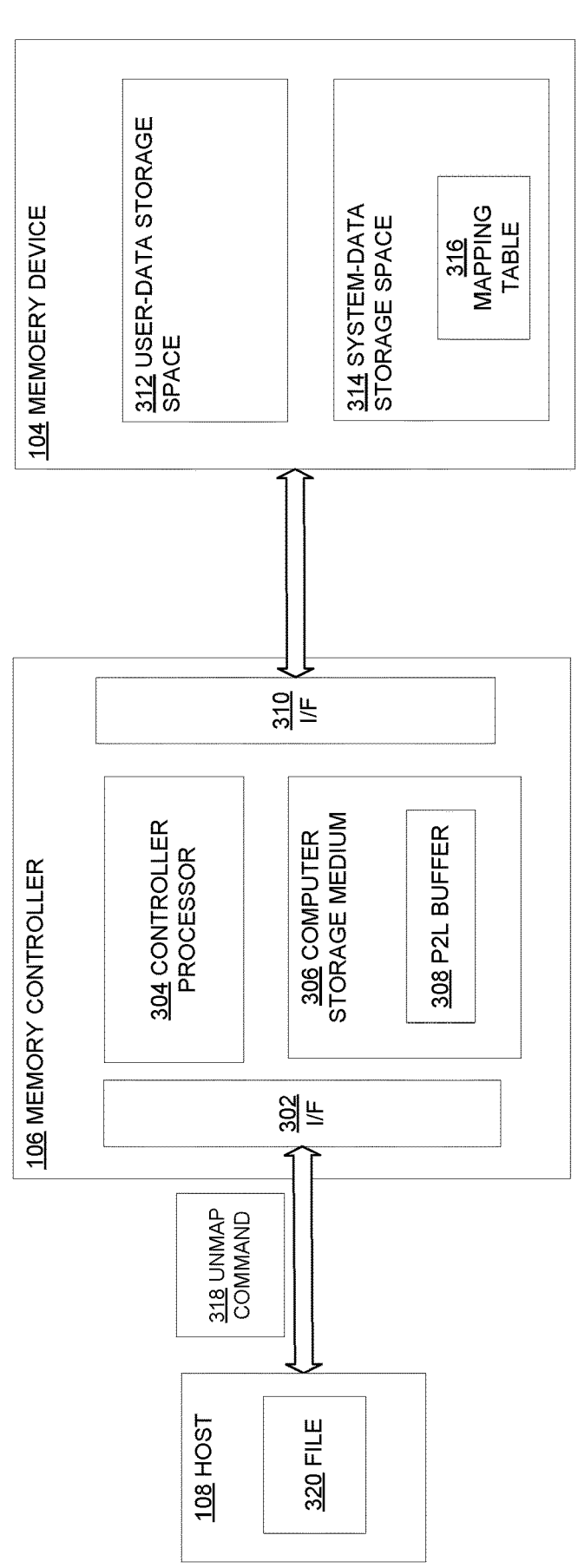
FIG. 3 illustrates a block diagram of an example system including a memory device, a memory controller, and a host, according to some aspects of the present disclosure.

FIG. 3 illustrates a block diagram of an example system 300 including a memory device 104, a memory controller 106, and a host 108, according to some aspects of the present disclosure. In some implementations, the memory device 104 is a NAND Flash memory device. The host 110 can store logical addresses (e.g., LBAs) of files (e.g., file 320). The file 320 can comprise its metadata including the file size, the device on which the file is stored, user and group IDs associated with the file, and/or permissions needed to access the file. The host 108 can be configured to send or receive commands (e.g., a program command, a read command, an erase command, or an unmap command 318) to or from memory systems (e.g., memory system 102).

As shown in FIG. 3, memory controller 106 can include a controller processor 304, such as a memory chip controller (MCC) or a memory controller unit (MCU). The controller processor 304 is configured to control modules to execute commands (e.g., unmap command 318) or instructions to perform functions disclosed in the present disclosure. The controller processor 304 can also be configured to control the operations of the memory device 104 by generating and sending various control signals, such as program instructions for program operations. In some implementations, the memory controller 106 can include one or more controller processors. The one or more processors can include a main processor and one or more secondary processors.

The memory controller 106 can further include a storage medium 306. The storage medium 306 can be a volatile memory or a non-volatile memory. In some implementations, the memory controller 106 can include a volatile controller and a non-volatile memory. The storage medium 306 in the form of a volatile memory can include a register or cache memory to allow faster access and process speed to read, program, or erase the data stored therein, while the stored information may not be retained when power is off. In some implementations, the storage medium 306 includes either dynamic random-access memory (DRAM) or static random-access memory (SRAM). The storage medium 306 in the form of a non-volatile memory can retain the stored information when power is off. In some implementations, the storage medium 306 in the form of a volatile memory can include NAND, NOR, FeRAM, PCM, MRAM, STT-RAM, or RRAM. In some implementations, the storage medium 306 may not be provided in the memory controller 106. For example, the storage medium 306 is coupled to and deposed outside of the memory controller 106. The storage medium 306 can further include a buffer. The buffer can be a pre-allocated storage space in the storage medium 306. The buffer can temporarily store data or commands from the host 108, before the data or commands are sent to or processed by the memory device 104. In some implementations, the buffer can further include a physical-to-logical (P2L) buffer 308 to temporarily store logical addresses corresponding to unmap commands of small chunk size. The P2L buffer 308 can be a pre-allocated portion of the buffer, and can have a storage size of 32 kb, 64 kb, 128 kb or other storage sizes as suited. In some implementations, after the data temporarily stored in the P2L buffer 308 are sent to the memory device 104 for processing, the P2L buffer 308 can be cleared for a new round of temporary storage.

As shown in FIG. 3, the memory controller 106 can include a first memory controller interface 302 configured to receive and transmit commands or instructions to and from host the 108. In some implementations, the first memory controller interface 302 is coupled to the controller processor 304 and is configured to receive and transmit commands or instructions that cause the controller processor 304 to perform functions disclosed in the present disclosure. Additionally, the memory controller 106 can include a second memory controller interface 310 configured to receive and transmit data or commands to and from the memory device 104. In some implementations, the second memory controller interface 310 is coupled to the controller processor 304 and is configured to transmit commands from the controller processor 304 to the memory device 104.

A mapping table 316 (e.g., an L2P mapping table 702 in FIG. 7), which shows a mapping relation between a plurality of logical addresses and a plurality of physical addresses, can be stored in various locations of the system 300. In some implementations, the mapping table 316 can be stored in a non-volatile memory such as memory device 104 (e.g., a NAND device), or in the storage medium 306 of the memory controller 106 in the form of a non-volatile memory. As such, address mapping data in mapping table 316 will not be erased after power off. In some implementations, mapping table 316 is stored and processed in a volatile memory such as storage medium 306 of memory controller 106 in the form of a volatile memory. In some implementations, after the system 300 boots up or restarts, the mapping table 316 can be loaded from the memory device 104 to the storage medium 306 of the memory controller 106. In some implementations, the mapping table 316 can include address mapping data corresponding to file 320 in the host 108.

In some implementations, the mapping table 316 can be a flash-translation-layer (FTL) table. The FTL table can include multiple entries that provide information for mapping host logical block addresses (LBAs) to physical addresses in the NAND. In some cases, two or more FTL tables can be employed. Locating a particular entry within the FTL table that corresponds to a particular host LBA can require computations implemented in a firmware of the memory controller. For example, a firmware component of the controller processor 304 can receive a read command associated with host LBAs. The firmware component can compute, based on the host LBAs, the FTL address of the entry within the FTL table, and the entry stores the information needed to convert (e.g., map) the host LBAs to a physical address in the NAND. The FTL address can then be used to access the FTL table to find the particular FTL entry. As such, the controller processer can read the mapping information out of the FTL to determine the physical address where the data to be read is currently stored in the NAND.

The memory controller 106 can include an address mapping table updating module (not shown in FIG. 3) configured to generate and update the mapping table 316. The address mapping table updating module can be implemented through a firmware program in the firmware of the controller processor 304. In some implementations, the address mapping table updating module is included in the controller processor 304 or coupled to the controller processor 304, and can be controlled by controller processor 304 to execute commands and instructions from the host 108. For example, the address mapping table updating module can be configured to execute a mapping update command received from the host 108 and update the mapping table 316 accordingly.

As shown in FIG. 3, the memory device 104 can include multiple storage spaces. In some implementations, the memory device 104 can include a user-data storage space 312 to store user data (e.g., documents, photos, video from a user), and a system-data storage space 314 to store system data (e.g., firmware, metadata of the memory system). In some implementations, the mapping table 316 is stored in the system-data storage space 314 of memory device 104. To update the mapping table 316, the original mapping table prior to the updates is read from the system-data storage space 314 and loaded to the memory controller 106. After the update is completed by the memory controller 106, the mapping table 316 is flushed to the system-data storage space 314 for storage. As such, updating mapping table 316 increases the wear level on the memory device 104 in system-data storage space 314.

Figure 4:
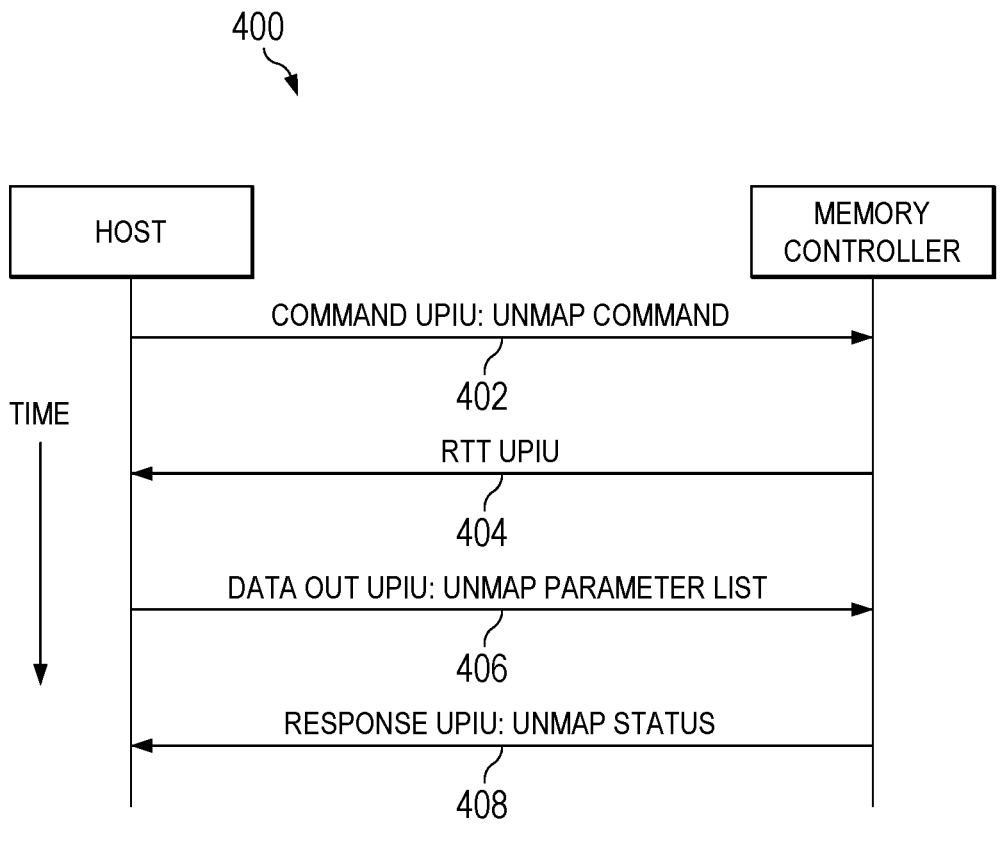
FIG. 4 illustrates an example method for communicating an unmap command between a host and a memory controller, according to some aspects of the present disclosure.

FIG. 4 illustrates an example method 400 for communicating an unmap command between a host and a memory controller, according to some aspects of the present disclosure. A host (e.g., the host 108 in FIG. 1) can send an unmap command (e.g., the unmap command 318 in FIG. 3) to free storage space in a memory device (e.g., the memory device 104 in FIGS. 1-3) allocated to or used to store unused data (e.g., files deleted by a user or no longer needed). The unmap command can be associated with one or more logical addresses of the unused data. In response to receiving the unmap command, the memory controller can update a mapping relation between the one or more logical addresses and one or more corresponding physical addresses where the unused data are stored in the memory device. As such, the one or more logical addresses are disassociated from the one or more physical addresses. The unmap command can be a UNMAP command with an operation code (Opcode) of 42H under UFS small computer small interface (SCSI) protocol. The unmap command can also be referred to as a Trim command under Advanced Technology Attachment 8 (ATA8) protocol, or a Dataset Management command under Non-Volatile Memory Express (NVMe) protocol.

In some implementations, the unmap command can be communicated between the host and the memory controller under SCSI protocol. At 402, the host sends a command UPIU (UFS Protocol Information Unit) that includes an unmap command to the memory controller. The command UPIU can include the Opcode of the unmap command. The command UPIC can further include a length (e.g., in bytes) of a parameter list associated with the unmap command, where the parameter list is to be sent to the memory controller later. In some implementations, the unmap command can be a discard unmap command of small chunk size. In other implementations, the unmap command can be an erase unmap command of large chunk size.

At 404, the memory controller sends a ready-to-transfer (RTT) UPIU to the host, indicating that the memory controller is ready to receive further data associated with the unmap command.

At 406, in response to receiving the RTT UPIU, the host sends a data-out UPIU to the memory controller. The data-out UPIU can include the parameter list associated with the unmap command. The parameter list can include a block descriptor (as further described in FIG. 5) that includes the logical addresses to be unmapped, and a length (e.g., in bytes) of the block descriptor.

At 408, the memory controller sends a response UPIU to the host, to indicate the processing status of the unmap command. For example, when the unmap command is an erase unmap command, the memory controller can send the response UPIU after the memory system completes the unmap operations and updates the mapping table. As another example, when the unmap command is a discard unmap command with small chunk size, the memory controller can send the response UPIU after the logical addresses to be unmapped are stored in the buffer of the memory controller, but before the memory system updates the mapping table.

Figure 5:
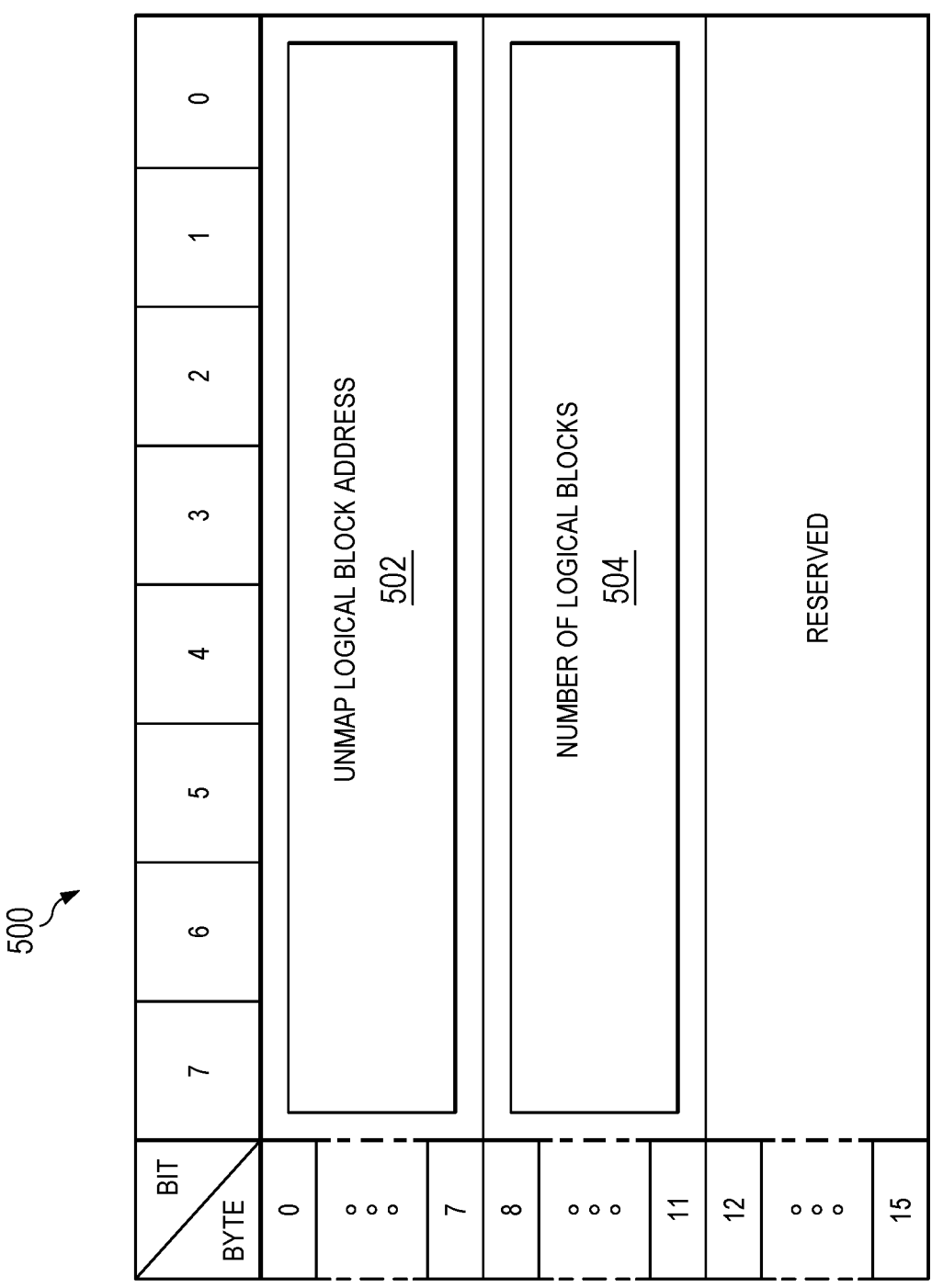
FIG. 5 illustrates an example data structure associated with an unmap command, according to some aspects of the present disclosure.

FIG. 5 illustrates an example data structure 500 associated with an unmap command, according to some aspects of the present disclosure. Referring back to FIG. 4, a host can send a parameter list associated with an unmap command to a memory controller (e.g., the memory controller 106 in FIGS. 1-3). The parameter list can further include a block descriptor that indicates the logical addresses (e.g., LBAs) to be unmapped. In some implementations, the block descriptor is in the form of the data structure 500. Data structure 500 can have 16 bytes, or have other sizes as suited.

The data structure 500 can include a starting logical address 502 (e.g., a starting LBA) of the logical addresses to be unmapped. The data structure 500 can further include a length 504 (e.g., a quantity of LBAs) of the logical addresses to be unmapped. Based on the starting logical address 502 and the length 504, the memory controller can calculate the rest of the logical addresses to be unmapped. For example, if an unmap command indicates unmap LBA 3, LBA 4, LBA 5, and LBA 6, the data structure 500 can include LBA 3 as the starting logical address 502 is LBA 3, and 4 as the length 504.

A memory system (e.g., the memory system 102 in FIG. 1) can determine how to process an unmap command based on one or more parameters in the parameter list associated with the unmap command. In some implementations, the memory controller will determine whether the length 504 of the logical addresses to be unmapped is smaller than or equal to a pre-determined threshold (e.g., 4, 8, or 16). If the length 504 is larger than the pre-determined threshold, the memory controller can disassociate the logical addresses with the corresponding physical addresses by updating the mapping table. If the length 504 is smaller or equal to the pre-determined threshold (i.e., the unmap command has small chunk size), the memory controller does not update the mapping table immediately. Instead, the memory controller can temporarily store the logical addresses in a buffer (e.g., the P2L buffer 308 in FIG. 3). In some implementations, the memory controller can also send a program (write) command to a memory device (e.g., the memory device 104 in FIGS. 1-3) to s data (e.g., dummy data associated with the logical addresses) in the memory device. The program command is associated with the logical addresses.

It should be noted that the data structure 500 is for illustration only. In some implementations, the logical addresses to be unmap as indicated by an unmap command are consecutive. In other implementations, the logical addresses to be unmap as indicated by an unmap command are not consecutive. For example, data structures in other forms can be configured to represent the non-consecutive logical addresses.

Figure 6:
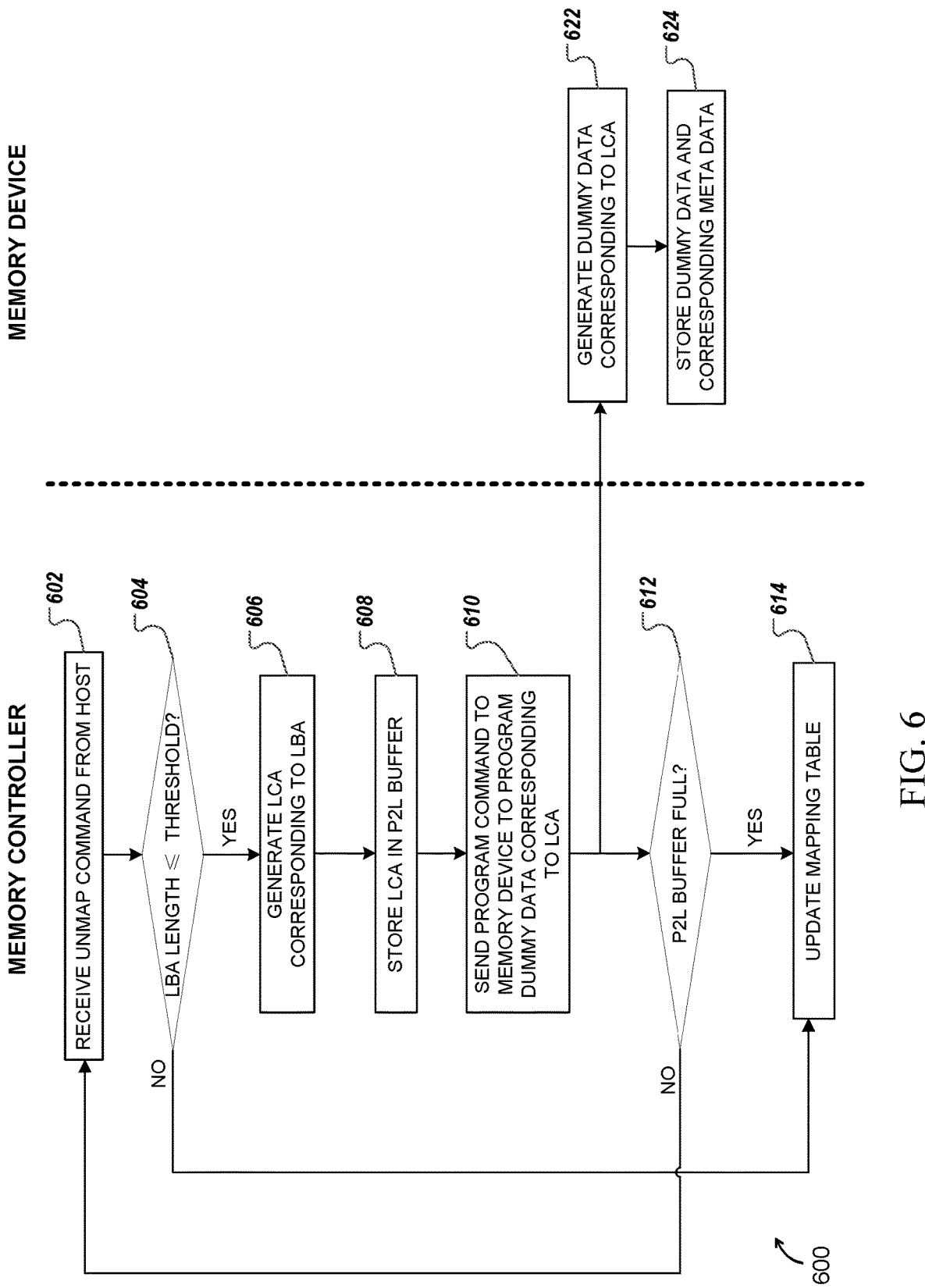
FIG. 6 illustrates a flowchart of an example method for processing unmap commands, in accordance with some aspects of the present disclosure.

FIG. 6 is a flowchart of an example method 600 for processing unmap commands, in accordance with some aspects of the present disclosure. The method 600 can be performed by a memory controller (e.g., the memory controller 106 in FIGS. 1-3) of a memory system (e.g., the memory system 102 in FIG. 1). The operations shown in method 600 may not be exhaustive and that other operations can be performed as well before, after, or between any of the illustrated operations. Further, some of the operations can be performed simultaneously, or in a different order than shown in FIG. 6. In some implementations, the method 600 can be performed by a firmware program of a controller processor (e.g., the controller processor 304 in FIG. 3) in the memory controller. Programming instructions can be stored in a computer readable medium (e.g., the storage medium 306 in FIG. 3) and executed by the controller processor to perform the operations shown in method 600. In some implementations, the programming instructions can be stored in a volatile memory (such as an SRAM). In some implementations, the programming instructions can be stored in a non-volatile memory (such as a NAND), so that they will not be erased after the memory controller powers off. The programming instructions can be loaded into a fast speed memory such as a tightly coupled memory (TCM) or a volatile memory and executed by the controller processor when the memory controller boots up.

At operation 602, the memory controller receives an unmap command from a host. The unmap command indicates that one or more logical addresses are to be unmapped from one or more corresponding physical addresses in a mapping table (e.g., the L2P mapping table 702 in FIG. 7). The unmap command can include a starting logical address (e.g., the staring logical address 502 in FIG. 5) of the one or more logical addresses, and a length (e.g., the length 504 in FIG. 5) of the one or more logical addresses. In some implementations, the starting logical address and the length of the logical addresses are included in a block descriptor of a parameter list associated with the unmap command.

At operation 604, the memory controller compares the length of the one or more logical addresses to be unmapped with a predetermined threshold (e.g., 4, 8, or 16). In some implementations, the predetermined threshold is set as 8 to achieve optimized efficiency. If the memory controller determines that length is greater than the predetermined threshold, method 600 proceeds to operation 614. If the memory controller determines that length is smaller than or equal to the predetermined threshold, the unmap command can be determined as an unmap command with small chunk size, and method 600 proceeds to operation 606.

At operation 606, the memory controller generates one or more logical cluster addresses (LCAs) corresponding to the one or more logical addresses (i.e., one or more LBAs) associated with the unmap command. After receiving the one or more LBAs from the host, the memory controller can calculate an LCA for each of the one or more LBAs. For example, the memory controller can calculate an outset for a LBA, and generate an LCA based on the outset and the LBA. In some implementations, an address conversion table (lookup table, LUT) can be used when calculating the one or more LCAs. In some implementations, the memory controller can mark each of the one or more LCAs generated from the one or more LBAs. In some implementations, the memory controller can use a pre-selected bit in the LCA as a "flag". For example, the LCA can have a storage size of 4 bytes, and the last bit of the 4 bytes can be designated as a "flag" to indicate that this LCA is associated with the unmap command with small chunk size (i.e., the length of the logical addresses to be unmapped is no greater than a predetermined threshold). The LCA is marked by flipping the pre-selected bit (e.g., flipping the bit from 0 to 1, or from 1 to 0). In some implementations, operation 606 may not be provided in the method 600. For example, the memory controller can perform operations in method 600 based on the LBAs in association with the unmap command from the host. The memory controller can flip a pre-selected bit of the LBA as a "flag" when storing the LBAs in the P2L buffer.

At operation 608, the memory controller stores the one or more LCAs in a buffer of the memory controller. In some implementations, the one or more LCAs are stored in a P2L buffer (e.g., the P2L buffer 308 in FIG. 3). The one or more LCAs can include the pre-selected bit after being flipped. In some implementations, the P2L buffers can be used to store the LCAs associated with unmap commands and LCAs associated with program commands.

At operation 610, in response to receiving the unmap command with small chunk size, the memory controller sends a program (write) command to the memory device to perform a program (write) operation associated with the one or more LCAs. The program command can include a physical address (e.g., a PCA). The physical address is generated by the memory controller based on the one or more LCAs. In some implementations, the program command instructs the memory device to store dummy data in the storage space indicated by the physical address. In some implementations, operation 610 is performed before or in parallel with operation 608.

At operation 622, in response to receiving the program command from the memory controller, the memory device can generate dummy data corresponding to the one or more LCAs. In some implementations, the dummy data are generated by a peripheral circuit of the memory device. In some implementations, operation 624 may not be provided in the method 600. For example, the dummy data corresponding to the one or more LCAs can be generated by the memory controller, and then sent to the memory device along with the program command.

At operation 624, the memory device stores the dummy data and meta data corresponding to the dummy data in the storage space indicated by the physical address. Since the dummy data is generated by the memory controller or the memory device, the dummy data does not include user data received from the host. The meta data corresponding to the dummy data can include the one or more LCAs associated with the unmap command. In some implementations, the meta data can further include the pre-selected bit of the one or more LCAs, to indicate that the dummy data are associated with the unmap command. In some implementations, the meta data corresponding to the dummy data can be used to restore the LCAs in the P2L buffer. For example, data in the P2L buffer of the memory controller may be lost due to accidental power loss. To restore the LCAs originally stored in the P2L buffer, the memory controller can read data in the memory device based on the physical address where the dummy data and corresponding meta data are stored. As such, the memory controller can retrieve the LCAs associated with the unmap command from the meta data in the memory device.

At operation 612, the memory controller determines whether to update the mapping table based on the status of the P2L buffer. In some implementations, the memory controller can compare the volume of LCAs stored in the P2L buffer to the size of the P2L buffer. If the P2L buffer is full, the memory controller can update the mapping table, and the method 600 proceeds to operation 614. If the P2L buffer is not full, the memory controller can wait to receive the next unmap command, and the method proceeds to operation 602. In other implementations, the memory controller can compare the size of remaining storage space in the P2L buffer with a predetermined size. The predetermined size can be a maximum size to store LCAs associated with the next unmap command of small chunk size (e.g., the size needed to store 8 LCAs, if the predetermined threshold for the length of the logical addresses to be unmapped is set as 8 in operation 604). If the remaining storage space in the P2L buffer is smaller than the predetermined size, the memory controller can update the mapping table, and the method 600 proceeds to operation 614. If the remaining storage space is larger than or equal to the predetermined size, the memory controller can wait to receive the next unmap command, and the method proceeds to operation 602. It should be noted that the memory controller can determine whether to update the mapping table based on other appropriate conditions.

At operation 614, the memory controller updates the mapping table based on LCAs stored in the P2L buffer. The LCAs stored in the P2L buffer are associated with more than one unmap command of small chunk size. For example, if the P2L buffer is full after storing LCAs associated with 16 unmap commands received from the host, the memory controller can unmap the LCAs associated with the 16 unmap commands by updating the mapping table only once. As such, unmap commands of small chunk size are processed in an accumulative way.

Figure 7B:
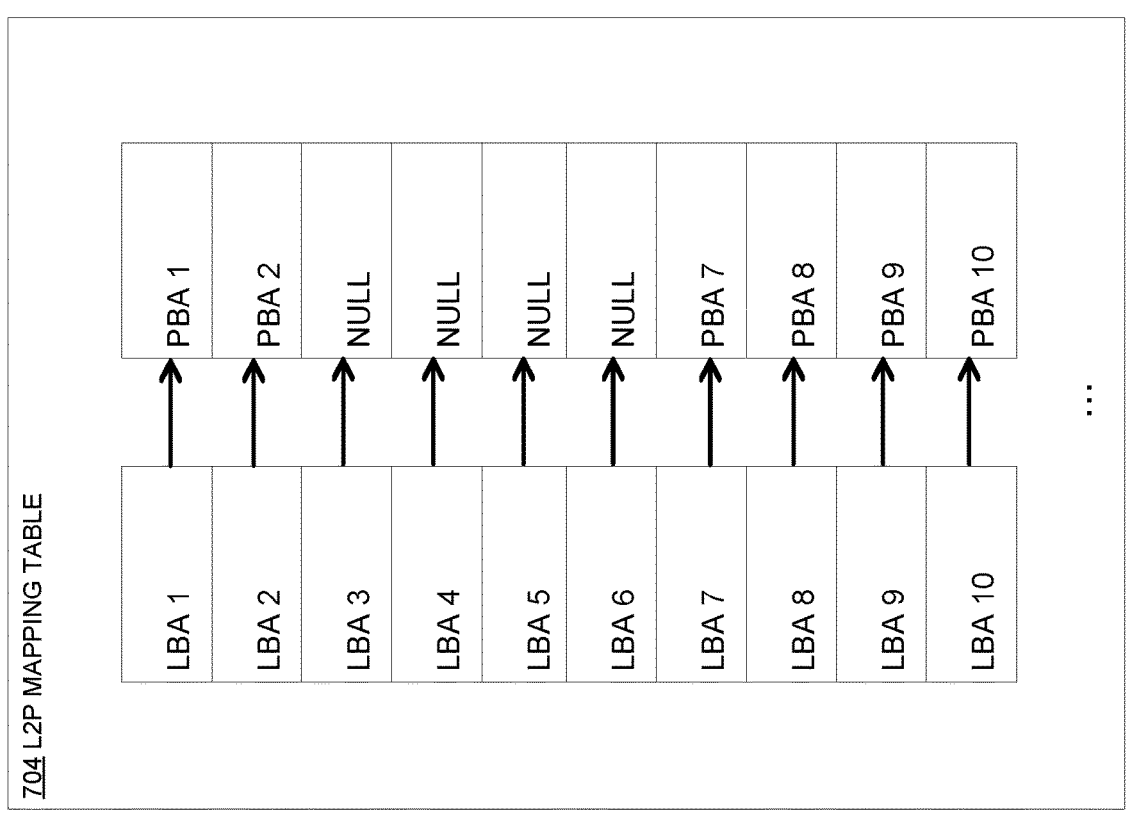
FIGS. 7A-7B illustrate example logical addresses and physical addresses in an L2P mapping table, according to some aspects of the present disclosure.
Figure 7A:
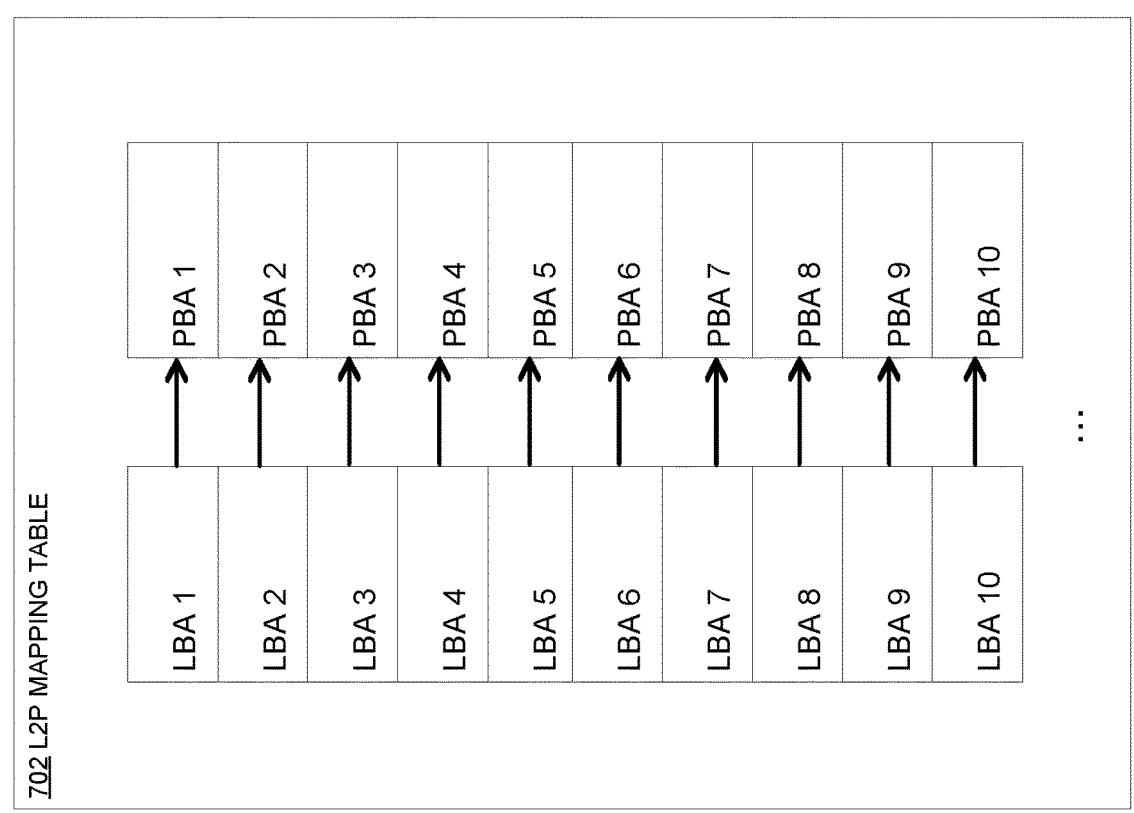

FIGS. 7A-7B illustrate example logical addresses and physical addresses of a L2P mapping table 702, according to some aspects of the present disclosure. In some implementations, a mapping table (e.g., the mapping table 316 in FIG. 3) can include a logical-to-physical (L2P) mapping table. As shown in FIG. 7A, the L2P mapping table 702 shows a mapping relation between a plurality of logical addresses and a plurality of physical addresses of the physical storage in a memory device (e.g., the memory device 104 in FIGS. 1-3). For example, logical address LBA 1 corresponds to physical address PBA 1, logical address LBA 2 corresponds to physical address PBA 2, etc. It should be noted that the index numbers of the PBAs are for illustrative purposes and may not suggest that PBA 1-10 respectively correspond to LBA 1-10 in the memory device. In some implementations, L2P mapping table 702 can be a single-level direct L2P mapping table. Under such mapping scheme, the mapping table includes an entry for each page, and a summary page for metadata at the end of each block that contains logical block address information. In some implementations, L2P mapping table 702 can be a multi-level L2P mapping table (e.g., a two-level L2P mapping table, a three-level L2P mapping table). For example, multi-level mapping schemes can group together a number of adjacent logical blocks, and can include a page global directory for each grouped block. The page global directories can be stored in a memory controller (e.g., the memory controller 106 in FIGS. 1-3) for quick access. The mapping scheme can also include page middle directories and page tables that are stored and maintained in pages located at a memory cell level in the spare areas of the memory device. The page tables can include physical block numbers and physical page numbers of the data.

Referring back to FIG. 6, the memory controller can accumulatively process unmap commands of small chunk size. The memory controller determines an unmap command of small chunk size by comparing the length of the logical addresses to be unmapped to a predetermined threshold (e.g., 8). As shown in FIG. 7A, if an unmap command indicates to unmap logical addresses LBA 3-LBA 6 from the corresponding physical addresses PBA 3-PBA 6, the memory controller 106 can determine that the unmap command is of a small chunk size. In response to receiving the unmap command of small chunk size, LBA 3-6 or their corresponding LCAs can be temporarily stored in a buffer (e.g., the P2L buffer 308 in FIG. 3) of the memory controller. The memory controller may not update the L2P mapping table 702 until the data stored in the buffer reaches a certain volume.

When the data stored in the buffer reaches a certain volume (e.g., the P2L buffer is full), the memory controller can update the L2P mapping table 702. For example, to unmap LBA 3-LBA 6 from the corresponding physical addresses in the L2P mapping table 702, the memory controller can change the corresponding physical address (PBA 3-PBA 6) to null (e.g., 0000 or ffff), as shown in FIG. 7B. Since logical addresses associated with more than one unmap command are unmapped in a single operation of updating the mapping table, besides PBA 3-PBA 6, physical addresses corresponding to more logical addresses (not shown in FIGS. 7A-7B) in the L2P mapping table 704 can be changed to null.

Figure 8:
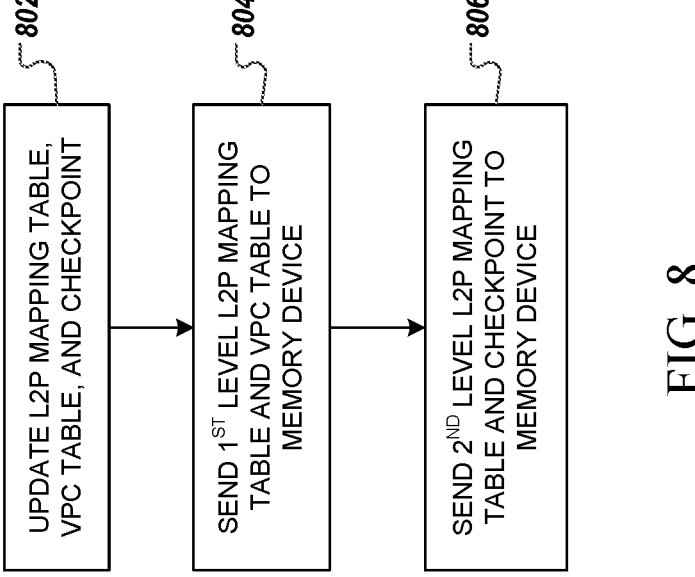
FIG. 8 illustrates a flowchart of an example method for updating a mapping table, in accordance with some aspects of the present disclosure.

FIG. 8 illustrates a flowchart of an example method 800 for updating a mapping table, in accordance with some aspects of the disclosure. In some implementations, the mapping table (e.g., the mapping table 316 in FIG. 3) can include a logical-to-physical (L2P) mapping table (e.g., the L2P mapping table 702 in FIG. 7), a valid-page-count (VPC) table and a checkpoint. The VPC table records used logical addresses and the number of valid pages for each block in the memory device. The memory controller increases the number of valid pages (i.e., a valid page count) for a specific block by one, when the memory controller programs one page data into an empty page of the specific block and maps a logical address with the physical address of the empty page in the L2P mapping table. The memory controller decreases the number of valid pages for a specific block by one, when the memory controller maps a logical address that was previously mapped to a first physical address in the specific block to a second physical address in a different block, or to a null physical address. The checkpoint can be used to prevent loss of valid data when the memory device is accidentally powered off. The checkpoint can include a snapshot of the latest L2P mapping table, the VPC table and other mapping tables. The checkpoint can be sent to the memory device for storage on a regular basis. In case of accidental power off, the memory controller can restore the mapping tables using the checkpoint.

At operation 802, the memory controller updates the L2P mapping table, the VPC table and the checkpoint based on the logical addresses (e.g., LCAs) stored in the P2L buffer. As shown in FIG. 7A-7B, the memory controller can update the L2P mapping table by changing the physical addresses corresponding to the logical addresses to be unmapped into null physical addresses. In some implementations, the L2P table can be stored in the memory device. Before updating the L2P mapping table, the memory controller can first load the L2P mapping table from the memory device to the storage medium of the memory controller. The memory controller can update the VPC table by decreasing the valid page count of one or more blocks, according to the number of logical addresses to be unmapped in each block. The memory controller can update the checkpoint by taking a snapshot of the updated L2P mapping table and the updated VPC table.

The memory controller can send the mapping tables (including the L2P table, the VPC table and the checkpoint) to the memory device (e.g., non-volatile NAND memory) for storage. For example, the memory controller can send the mapping tables to the memory device after each update or several updates. In some implementations, the L2P mapping table can be a single-level direct L2P mapping table. The memory controller can send the L2P mapping table, the VPC table and the checkpoint in a single data transfer to the memory device. In other implementations, the L2P mapping table can be a multi-level L2P mapping table (e.g., a two-level L2P mapping table). At operation 804, the memory controller sends the first-level L2P mapping table and the VPC table in a single data transfer to the memory device. At operation 806, the memory controller sends the second-level L2P mapping table and the checkpoint in a single data transfer to the memory device. In some implementations, the L2P mapping table can include a third-level L2P mapping table. In some implementations, the third-level mapping table can be included in the checkpoint, and can be sent to the memory device together with the checkpoint.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, such operations are not required be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations are not required in all implementations, and the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described example implementations, but should be defined only in accordance with the following claims and their equivalents. Accordingly, other implementations also are within the scope of the claims.

What is claimed is:

1. A method for operating a memory system, comprising:
receiving, from a host coupled to the memory system, an unmap command corresponding to one or more logical addresses;
in response to determining that a quantity of the one or more logical addresses is less than or equal to a first threshold, storing the one or more logical addresses in a buffer of a memory controller of the memory system;
sending, by the memory controller to a memory device of the memory system, a program command that causes the memory device to program data related to the one or more logical addresses and the unmap command at a physical address, wherein the data related to the one or more logical addresses and the unmap command comprise metadata including the one or more logical addresses;
in response to restoring the one or more logical addresses in the buffer, receiving, from the memory device, the one or more logical addresses; and
updating a mapping table based on logical addresses stored in the buffer to unmap a mapping relationship between the logical addresses and corresponding physical addresses in the mapping table, wherein the logical addresses stored in the buffer correspond to more than one unmap command.

2. The method of claim 1, wherein the method further comprises:
in response to determining that a data volume of the logical addresses stored in the buffer is greater than or equal to a second threshold, updating the mapping table.

3. The method of claim 2, wherein the buffer comprises a physical-to-logical (P2L) buffer, wherein the logical addresses stored in the buffer are stored in the P2L buffer, and wherein the second threshold is a size of the P2L buffer.

4. The method of claim 1, wherein storing the one or more logical addresses in the buffer further comprises:
flipping a pre-selected bit in each one of the one or more logical addresses to indicate the one or more logical addresses are to be unmapped from corresponding one or more physical addresses when updating the mapping table.

5. The method of claim 1, wherein the method further comprises:
in response to receiving the unmap command, performing a program operation associated with the one or more logical addresses.

6. The method of claim 5, wherein the program command is associated with the program operation.

7. The method of claim 6, wherein the program operation comprises storing meta data in the memory device, wherein the meta data comprise the one or more logical addresses.

8. The method of claim 1, wherein the mapping table comprises a logical-to-physical (L2P) mapping table, a valid-page-count (VPC) table and a checkpoint, and wherein updating the mapping table comprises:
updating the corresponding physical addresses in the L2P mapping table; and
updating the VPC table and the checkpoint based on the logical addresses stored in the buffer.

9. The method of claim 8, wherein the L2P mapping table comprises a first-level L2P mapping table and a second-level L2P mapping table, and wherein the method further comprises:

respectively sending to the memory device: (1) the first-level L2P mapping table and the VPC table, and (2) the second-level L2P mapping table and the checkpoint.

10. The method of claim 1, wherein the unmap command comprises a discard unmap command.

11. A memory controller comprising:

one or more processors; and a storage medium that comprises a buffer, wherein the storage medium stores instructions for execution by the one or more processors to perform operations comprising:

receiving, by the memory controller, an unmap command corresponding to one or more logical addresses;

in response to determining that a quantity of the one or more logical addresses is less than or equal to a first threshold, storing the one or more logical addresses in the buffer;

sending, by the memory controller to a memory device of a memory system, a program command that causes the memory device to program data related to the one or more logical addresses and the unmap command at a physical address, wherein the data related to the one or more logical addresses and the unmap command comprise metadata including the one or more logical addresses;

in response to restoring the one or more logical addresses in the buffer, receiving, from the memory device, the one or more logical addresses; and updating a mapping table based on logical addresses stored in the buffer to unmap a mapping relationship between the logical addresses and corresponding physical addresses in the mapping table, wherein the logical addresses stored in the buffer correspond to more than one unmap command.

12. The memory controller of claim 11, wherein the buffer comprises a physical-to-logical (P2L) buffer, wherein the logical addresses stored in the buffer are stored in the P2L buffer.

13. The memory controller of claim 11, wherein the unmap command comprises a discard unmap command.

14. A memory system comprising:

a memory device; and a memory controller coupled to the memory device, wherein the memory system is configured to perform operations comprising:

receiving, from a host coupled to the memory system, an unmap command corresponding to one or more logical addresses;

in response to determining that a quantity of the one or more logical addresses is less than or equal to a first threshold, storing the one or more logical addresses in a buffer of the memory controller;

sending, by the memory controller to a memory device of the memory system, a program command that causes the memory device to program data related to the one or more logical addresses and the unmap command at a physical address, wherein the data related to the one or more logical addresses and the unmap command comprise metadata including the one or more logical addresses;

in response to restoring the one or more logical addresses in the buffer, receiving, from the memory device, the one or more logical addresses; and updating a mapping table based on logical addresses stored in the buffer to unmap a mapping relationship between the logical addresses and corresponding physical addresses in the mapping table, wherein the logical addresses stored in the buffer correspond to more than one unmap command.

15. The memory system of claim 14, wherein the buffer comprises a physical-to-logical (P2L) buffer, wherein the logical addresses stored in the buffer are stored in the P2L buffer.

16. The memory system of claim 14, wherein the operations further comprise:

in response to receiving an unmap command, performing a program operation associated with the one or more logical addresses.

17. The memory system of claim 16, wherein the program command is associated with the program operation, and wherein the program operation comprises:

storing meta data in the memory device, wherein the meta data comprise the one or more logical addresses.

18. The memory system of claim 14, wherein the mapping table comprises a logical-to-physical (L2P) mapping table, a valid-page-count (VPC) table and a checkpoint, and wherein updating the mapping table comprises:

updating the corresponding physical addresses in the L2P mapping table; and updating the VPC table and the checkpoint based on the logical addresses stored in the buffer.

19. The memory system of claim 18, wherein the L2P mapping table comprises a first-level L2P mapping table and a second-level L2P mapping table, and wherein the operations further comprises:

respectively sending to a memory device coupled to the memory controller: (1) the first-level L2P mapping table and the VPC table, and (2) the second-level L2P mapping table and the checkpoint.

20. The method system of claim 14, wherein the unmap command comprises a discard unmap command.

* * * * *